United States Patent [19]
Schulze

[11] 3,849,180
[45] Nov. 19, 1974

[54] PROCESS FOR BONDING PARTICULATE SOLID MATERIALS TO A SUBSTRATE

[75] Inventor: Reinhold Schulze, Hamburg, Germany

[73] Assignee: Norddeutsche Affinerie, Hamburg, Germany

[22] Filed: May 24, 1972

[21] Appl. No.: 256,323

[30] Foreign Application Priority Data
May 25, 1971 Germany.............................. 2125781

[52] U.S. Cl...... 117/100 B, 106/308 M, 117/100 S, 117/123 D
[51] Int. Cl............................................. B44d 1/02
[58] Field of Search......... 117/100 S, 100 B, 123 D, 117/105.5; 252/428, 430; 106/308 M

[56] References Cited
UNITED STATES PATENTS

| | | | |
|---|---|---|---|
| 3,574,662 | 4/1971 | Gage | 117/27 |
| 3,667,998 | 6/1972 | Esser | 117/105.5 |
| 3,672,945 | 6/1972 | Taylor | 117/100 S X |

FOREIGN PATENTS OR APPLICATIONS

| | | | |
|---|---|---|---|
| 2,013,320 | 4/1970 | France | |

Primary Examiner—William D. Martin
Assistant Examiner—Dennis C. Konopacki
Attorney, Agent, or Firm—Karl F. Ross; Herbert Dubno

[57] ABSTRACT

A process for bonding particulate solid active substances, such as adsorbents, catalysts or similar solids, to subdivided substrates, e.g. silica, aluminas silicate, coke breeze aluminate or aluminosilicate minerals, wherein the bonding is carried out in an aqueous medium in the presence of at least two water-soluble substances added in succession as flocculating agents to the aqueous dispersion of the salts. The two flocculating agents have general formulas R — A and R' — B, one of which has a preferable affinity to the active solid while the other may have a preferable affinity for the substrate and together when deposited upon the substrate, form a water-insoluble adhesive comprising bonding the active solid to the substrate. R and R' may be polymer groups consisting of maleic, vinylic, acrylic, methacrylic or styrenic homopolymers, copolymers or mixed polymers, possibly having other A or B functionality. A is a carboxyl, sulfuric or phosphoric functional group while B may be a nitrogen-containing basic functional group such as amine, amide, imine or imide.

7 Claims, 2 Drawing Figures

PATENTED NOV 19 1974 3,849,180

PROCESS FOR BONDING PARTICULATE SOLID MATERIALS TO A SUBSTRATE

FIELD OF THE INVENTION

My present invention relates to a process for bonding subdivided solids to subdivided substrates and, more particularly, a method of bonding particulate active solids to granular, aggregated or other particulate substrates.

BACKGROUND OF THE INVENTION

In many cases, it is desired to apply layers of one solid to a nucleus, core, grain or other piece of substrate material for use in chemical processing and chemical technology in general. For example, a substrate may consist of a mineral substance, e.g. silica, alumina, coke breeze, a silicate, aluminate or an aluminosilicate forming a carrier for an active substance having adsorption, catalyst or other chemical reaction-inducing, reaction-promoting, reaction-precipitating and reaction-controlling purpose. When the term "subdivided solid" is used herein to describe such substrates, it should be noted that it is intended thereby to define granular, lumpy or piece-like solids (as distinct from substrates with a continuous surface such as a sheet). In many cases chemisorbents, catalysts and reaction participants in solid form (e.g. subdivided as a powder) may be applied to such substrates in a porous layer having a high surface area (effective) and preferably a high effective surface area/volume ratio.

It has been proposed to prepare such systems by precipitating the active solids onto the substrate from solution although this has not always been effective because of the poor bonding of the precipitating solid to the inactive or inert substrate. For example, when the precipitated material is a hydrated oxide or hydroxide of a metal, the bonding process, which can require heating, may result in a loss of water to the detriment of the activity of the solid. In other cases contact of the precipitated solid with air irreversibly deactivates the precipitated material.

It has also been proposed to employ flocculating agents to produce precipitation in the manner described even though such systems have proved inadequate for many purposes because the formation of the deposit on a substrate is difficult and prior flocculating agents were incapable of promoting effective bonding between the precipitated material and the substrate.

OBJECTS OF THE INVENTION

It is the principal object of the present invention to provide an improved process for bonding an active solid to a subdivided substrate whereby the aforementioned disadvantages can be obviated.

Another object of the invention is to provide a chemically-active substance in particulate and porous form upon an inert solid in granular or piece form whereby a firm bond of the active material to the substrate material is ensured.

Another object of the invention is to provide an improved method of making highly active chemisorbents, catalysts and reactive systems in a relatively inexpensive manner such that the product is free from the tendency to spalling, abrasion-loss and the like characterizing other systems in which an active material is applied to a substrate.

Yet another object of the invention is to provide an improved method of forming a highly porous active coating of a solid material upon a subdivided substrate.

SUMMARY OF THE INVENTION

These objects and others which will become apparent hereinafter are attained, in accordance with the present invention, in a method of applying a subdivided active solid to a subdivided inactive solid hereinafter referred to as the substrate material, the method comprising bonding the active solid to the substrate with an adhesive formed in situ and constituted of two flocculating agents or a flocculating system comprising at least two flocculating agents interactive to produce the adhesive.

According to the invention, a porous layer is applied to a subdivided substrate material which may be inactive with respect to the reaction system in which the system is to be used and is chemically inert with respect to interaction with the active material, by introducing two water-soluble substances into an aqueous suspension containing the solids, the two water-soluble substances being chemically interactive as noted above and forming a flocculating system. At least one of the water-soluble substances has a preferable affinity for the active substance while the other may have a preferable affinity to the substrate material although this is not always necessary. The two substances, however, should be capable of reacting to form a bonding agent between the active solid and the substrate material, the reaction product being a water-insoluble adhesive composition bonding to the substrate material or support and to the active solid, e.g. by purely enclosing the latter or penetrating pores of the layer of the active material which is applied to the substrate material.

According to a further feature of the invention, the porous coating of the active solids upon the substrate material may be treated with a dispersion of water-insoluble substances capable of supplementing the adhesive properties of the flocculating system and forming nonadhesive porous surfaces over the active layer to encapsulate the latter while permitting the active material to remain free for heterogeneous activity in reaction systems. In such reaction systems, a fluid, either gas or liquid, may contact the solid substance through the porous encapsulating layer thereon.

According to another feature of the invention, the flocculating agents form an acid-base reaction pair and are organic acids and organic bases respectively. The agents may have the general formulae R — A and R' — B wherein R and R' may be the same or different organic modalities and A and B respectively represent acid and basic functionalities. The R and R' modalities are preferably polymer groups which can contain further acid and basic modalities A and B or may be free from such functionality but preferably include one or more of the monomers selected from the group which consists of maleic, vinylic, acrylic, methacrylic and styrenic monomers.

The monomers may be substituted or unsubstituted and, if substituted, may contain fluorine, chlorine, alkyl with 1 to 6 carbon atoms, ethoxy with 1 to 20 ethylene oxide groups per molecule, aryl (i.e. a benzene ring substituted as described above or unsubstituted) or nitrile. The polymer modalities R and R' may be homopolymers, copolymers or mixed polymers. A, the acid modality, is preferably a carboxyl, sulfonic or phosphoric-acid functional group which may be partly esterified but preferably, is free from esterification although it will be effective as long as it is capable of entering into an acid-base neutralization reaction with the base functionality B. The latter is preferably a nitrogen-containing base of amine, amide, imine or imide type.

The system according to the present invention, makes use of the adhesivity or bonding effectiveness of the composition formed by the two water-soluble flocculating agents and components of the flocculating system, the adhesiveness and toughness of the adhesive bond being a function of the cover of the water-soluble substances and the proportions in which they are used. Since the externally exposed surfaces of the porous layer containing the adhesive composition may be tacky or may have a high affinity for other materials, I prefer to provide an antibonding agent along these externally exposed surfaces. This antibonding agent may be a water-insoluble substance which has an affinity to at least one of the previously applied water-soluble agents and is preferably added in the form of a latex to provide a thin coarse porous layer upon the adhesive or bonding layer. Any unbonded surplus of this antibonding agent will remain dispersed in the latex and has little if any effect on the system. It is possible to destroy this antibonding material simply by modifying the pH so that the antibonding effect may require either a repeated application of the disperson of the application of a sufficient quantity of the disperson to prevent total destruction by any change in pH. The antibonding substance, where it is a porous film-forming material, also has the ability to stabilize the porous active coating. The antibonding substance need not be used, moreover, when the external adhesivity of the active layer is slight.

According to another feature of the invention, one of the water-soluble agents, or both of the water-soluble agents which are capable of flocculating the active material, is a polyelectrolyte, i.e. a high-molecular weight substance which is either acidic or basic and may even be nonionizable or substantially nonionogenic, such as the high-molecular weight acid amides. Such compounds yield insoluble adhesive materials with basic polyelectrolytes. The acid character is, as has been noted, preferably produced by the carboxyl, sulfonic or phosphoric acid modalities. The basic functionality is preferably produced by groups which contain nitrogen as already noted.

While the number of substances which may be used for the present invention is relatively large, a suitable test is the flocculating ability of the two agents and the ability, in an aqueous system, to form an adhesive composition which is bonding to the pieces of substrate. The composition or one of its components should have an affinity for the active solid to be bonded to the pieces of substrate. However, I have found that a limited group of compounds is particularly useful for the purposes of the present invention, these being the homopolymers or copolymers of maleic, acrylic or methacrylic acid, vinyl, styrene and the products formed by the complete or partial decomposition or saponification of esters or amides. Best results have been obtained with polyethylene imines. The antibonding third substance may be acidic or basic but should have a water-insoluble character and can be used in the form of a dispersion.

Several methods of treatment may be used. For example, the pieces of the substrate may first be treated with one of the flocculating agents, e.g. the one having lesser affinity for the active solid, whereupon the active solid is caused to precipitate upon the substrate. The first-applied flocculating agent may be applied in the form of a solution which is dried and may be accompanied in the case of polyethylene imine or another nitrogen base, by a hardening agent such as epichlorohydrin. The flocculating agent may also be applied in part to the pieces of the substrate by treating the latter with an aqueous system to which a small proportion of the two water-soluble agents have been added. The substance from which the active solid is precipitated may then be introduced. A wetting agent may be added to facilitate intimate contact with the surface of the pieces of the substrate.

DESCRIPTION OF THE DRAWING

The above and other objects, features and advantages of the present invention will become more readily apparent from the following description, reference being made to the accompanying drawing in which.

SPECIFIC DESCRIPTION AND EXAMPLES

Figure 1:
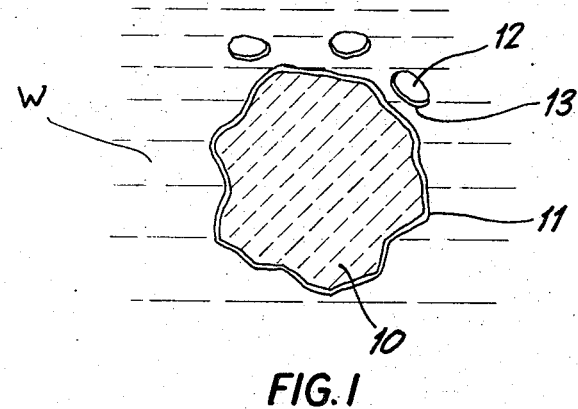
FIG. 1 is a diagrammatic sectional view of the body according to the present invention in an intermediate stage.
Figure 2:
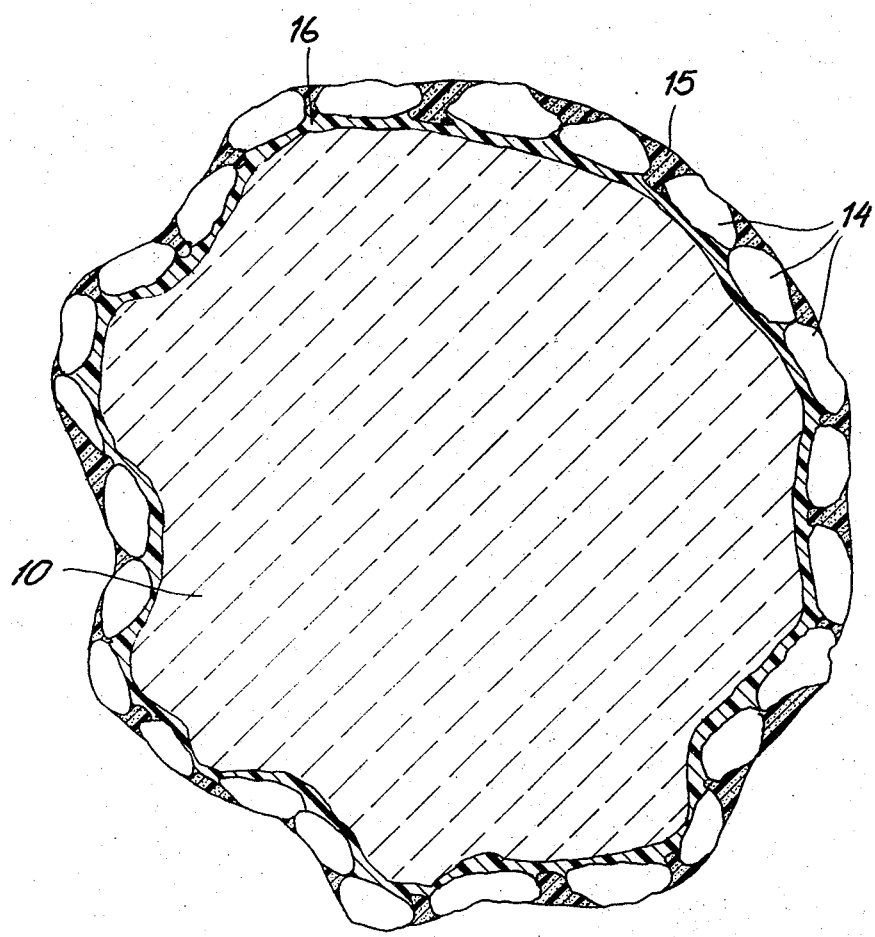
FIG. 2 is a view of the finished body.

In FIG. 1, I have shown an aqueous medium W which contains substrate pieces 10 of a ceramic or refractory material, e.g. a silica-containing substance such as sea sand, the pieces or grains having been previously coated at 11 with a polyethylene amine hardened with epichlorohydrin. Stannic acid or oxide particles 12, which pick up the other flocculating agent in the solution, migrate toward the substrate pieces 10 until the surfaces 13 of the coating particles react with the layer 11 to bond the particles to the substrate in a porous layer as represented at 14 in FIG. 2. This layer has an adhesive 16 bonded between its particles and the pieces of the substrate and may be filled at 16 with a porous stabilizing layer which is insoluble in water.

EXAMPLE I

A solution containing 1 kg of a polyacrylamide and a solution containing 5 kg of polyethyleneimine with an equivalent weight of 320 are added in succession and with stirring to a suspension of 400 kg stannic acid (30 percent solids) and 500 kg of fine grain sea sand in 1.5 $m^3$ of water. Each grain of the substrate was thus covered by a microporous adhesive composition containing all of the stannic acid. The microporous layer was stabilized by the addition of 40 kg of a 5 percent dispersion of an amine-active acrylate copolymer which formed a coarsely porous covering around the grains.

EXAMPLE II

An aqueous suspension containing 100 kg of coke-breeze (fine-grain substrate) with a particle size of 0.5 to 1 mm in 1.5 $m^3$ of water is prepared and 250 g of polyacrylamide flocculating agent and 500 g of a polyethyleneimine flocculating agent having an equivalent weight of 120 are added in succession with stirring.

After stirring for 10 minutes 400 kg of stannic acid (30 percent solids) is added and the flocculating step described in Example I is carried out with three times the amount of flocculating there set forth, namely 750 g of polyacrylamide and 1,500 g polyethyleneimine. The result was a microporous adhesive composition containing all of the stannic acid. The aftertreatment with amine-active acrylate copolymer was not necessary.

The system has been found to be particularly effective for the preparation of active materials in granular form, especially in adsorption columns having a high liquid throughput. The system is resistant to hot acids and can be employed to recover flocculating slimes and dissolved arsenic, antimony or bismuth, e.g. by the treatment of the liquors obtained in the electrolytic refining of copper.

I claim:

1. A process for bonding a particulate active solid consisting of stannic acid to pieces of a substrate, which comprises depositing said particulate active solid upon said pieces of said substrate from an aqueous medium in the presence of a flocculating system consisting of two successively introduced flocculating agents, at least one of said agents having an affinity for the active solid while said agents are interactive to form a bonding substance adhering the active solid to said pieces of substrate in a porous layer, said pieces consisting of coke breeze, silica, alumina, a silicate aluminate or an aluminosilicate, said agents having respectively the general formula R — A and R' — B wherein R and R' are homopolymer, copolymer or mixed polymer groups consisting of maleic, vinylic, acrylic, methacrylic or styrenic repeating units and A and B represent respectively acid and basic functionality.

2. The process defined in claim 1, further comprising the step of treating said layer with an agent forming a porous antibonding film on said layer.

3. The process defined in claim 1 wherein said one of said agents is a high-molecular-weight acid amide.

4. The process defined in claim 3 wherein said one of said agents is a polyacrylic acid derivative and the other of said agents is a polyethyleneimine.

5. The process defined in claim 1 wherein said pieces are first treated with one of said flocculating agents and are thereafter contacted with an aqueous medium containing the other of said flocculating agents and said active solid.

6. The process defined in claim 1 wherein one of said agents is a polyacrylamide and the other of said agents is a polyethyleneimine participating in an acid-base reaction with polyacrylamide.

7. The process defined in claim 6 wherein said pieces are grains of sea sand.

* * * * *